(No Model.)
H. W. LEONARD.
REGULATING ELECTRIC MOTORS.
No. 572,903. Patented Dec. 8, 1896.
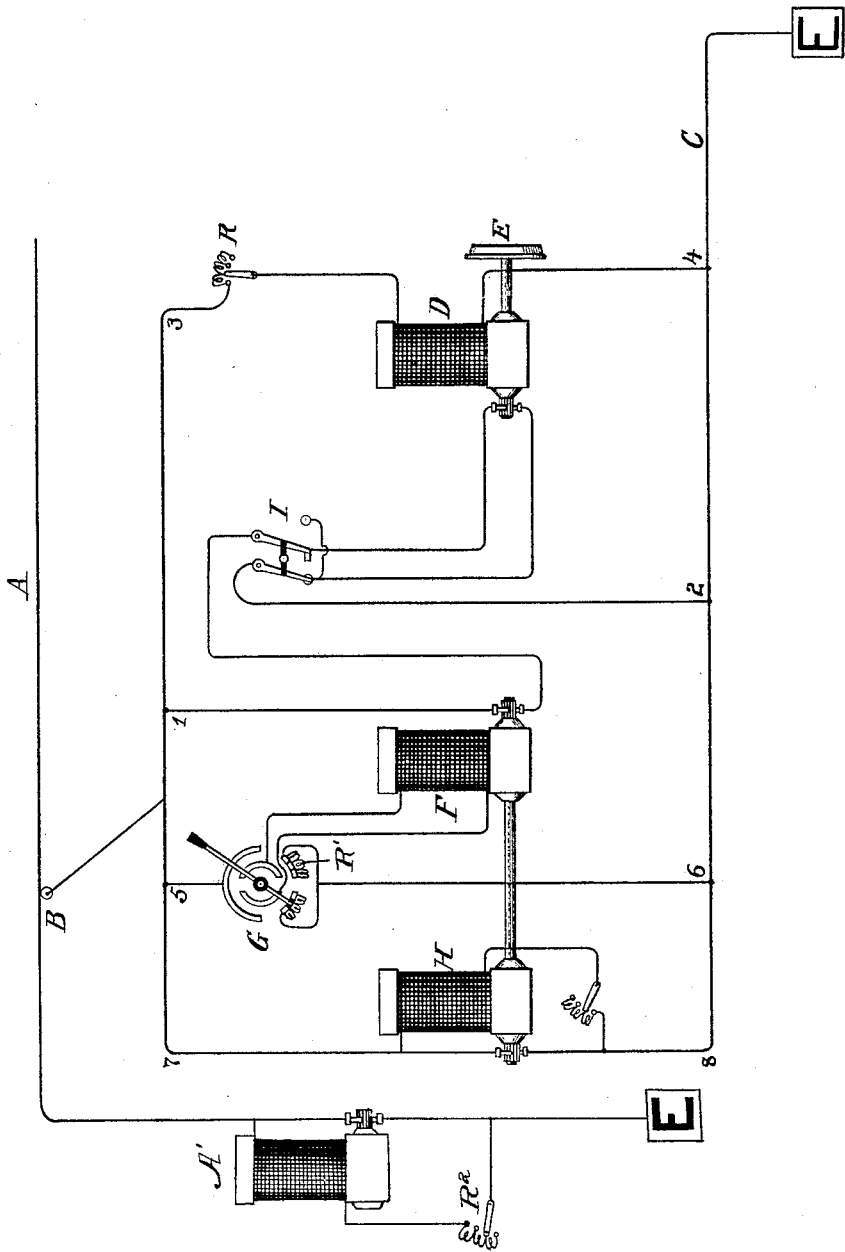
Witnesses
Norris F. Clark.
N. F. Oberly
Inventor
H. Ward Leonard
By his Attorneys
Dyer & Seely

UNITED STATES PATENT OFFICE.

HARRY WARD LEONARD, OF NEW YORK, N. Y.

REGULATING ELECTRIC MOTORS.

SPECIFICATION forming part of Letters Patent No. 572,903, dated December 8, 1896.

Application filed June 24, 1892. Serial No. 437,829. (No model.)

*To all whom it may concern:*

Be it known that I, HARRY WARD LEONARD, a citizen of the United States, residing at New York city, county and State of New York, have invented a certain new and useful Improvement in Regulating Electric Motors, of which the following is a specification.

The object of my invention is to provide an efficient and economical method of and means for varying the electromotive force upon and current through electrical translating devices, especially for the purpose of varying the speed and torque of electric motors.

In carrying my invention into effect I interpose in the circuit between the source of electric energy and the translating device a device producing independently of the translating device an electromotive force which is variable at will and in some instances reversible, whereby the electromotive force supplied to the translating device may be varied between wide limits. I prefer to employ as the device which produces electromotive force independently of the translating device the armature of a dynamo-electric machine which is connected in series with the translating device relative to the source and which is mechanically connected with another dynamo-electric machine electrically connected with the source.

My invention is illustrated in the accompanying drawing, which is a diagram illustrating the application of my invention to a motor used to propel a vehicle.

A is the line conductor or trolley-wire. B is the trolley taking current from said conductor, and C indicates the ground connection usually made in electric railways.

A' is the main generator or source of supply, connected between the trolley-wire A and the earth, and preferably consisting of a dynamo-electric machine having a field-magnet of practically constant strength and producing a practically constant electromotive force, but which may be provided with an adjustable resistance $R^2$ for varying its field strength, if occasion requires it.

D is the electric motor used to propel the car, as is indicated by the connection of its armature-shaft with the wheel E, the armature of D being the translating device upon whose terminals it is desired to regulate or vary the electromotive force.

F is a dynamo-electric machine placed upon the car.

The armatures of D and F are in series in the circuit 1 2 across the line. It will be seen also that the armature of dynamo F is in series with that of the main generator A', and that the field-magnets of these two dynamos are in multiple-arc relation to each other. The field-magnet of motor D is kept constantly excited by the circuit 3 4, but an adjustable resistance R may be provided in this field-circuit, so that the strength may be varied in case of necessity. Under ordinary conditions, however, the field-magnet is preferably maintained at a constant strength. The field-magnet of the dynamo F is connected across the line in circuit 5 6, which circuit contains a reversing and resistance-controlling rheostat G.

H is another dynamo-electric machine placed upon the car. The armature of this machine is connected in the circuit 7 8 in multiple with the armatures of F and D relative to the source, and its field-circuit is in multiple with its armature relative to the source. The field strength of this machine is preferably maintained constant, but a rheostat is provided in series with the field-circuit for varying the strength of its field, if desired. The armatures of the machines H and F are mechanically coupled together.

Since the machine H is connected across a practically constant electromotive force, its speed will be practically constant. The armature of the machine F being mechanically connected with the armature of the machine H, the speed of the armature of the machine F will also be practically constant, and hence its electromotive force will be dependent upon its field magnetism only. It will be noted that the electromotive force produced by the machine F and the electromotive force upon the terminals of the armature of machine D do not, practically speaking, affect the electromotive force between the points 5 and 6, to which the field-circuit of the machine F is connected, and that consequently the electromotive force produced by the machine F which is variable and reversible by means of the rheostat G, is variable and reversible independently of the electromotive force produced by the armature of the machine F and independently of the electromotive force upon the terminals of the translating device, that is, the armature of D, and also independently of the current passing through the armatures of F and D.

If we assume the field-magnet of dynamo F to be fully excited in such a direction that its electromotive force is counter and equal to that of the line, there will be no electromotive force upon the armature of the motor D and no current through the armatures of the machines F and D, the car will be at rest, and the machines H and F will both be running at full speed, but with no load other than friction.

If it be desired to slightly increase the electromotive force upon the terminals of the armature of machine D, the field-magnet of the electromotive-force-producing device F is weakened by means of the adjustable resistant R', which results in a decrease of its electromotive force, but a tendency upon the part of its armature to run faster. The electromotive force of F being now less than that of the machines H and A', each of these two machines will send a current through the armatures of the machines F and D. It will be noted that in so doing machines H and A' will both be generators acting in multiple to supply current to the armatures of the machines F and D, which are in series with each other and both of which will be acting as motors. The resulting current through the translating device—viz., the armature of D—will cause it to be operated so that there will be an electromotive force upon its terminals which will be the difference between the volts upon the supply-circuit and the volts produced by machine F. Under these conditions F, operating as a motor, will absorb watts represented by the product of the amperes through the armatures of machines F and D, times the difference between the volts desired upon the armature of D and the volts of the supply-circuit. Such watts will be transformed into mechanical energy in the shaft connecting machines H and F, and this mechanical energy will then drive H as a generator, which will produce useful electric energy supplied through the circuit 7 1 2 8 to the armatures of the machines F and D. It will be noted that this circuit 7 1 2 8 constitutes a local closed loop, and that H supplies part of the current for the armatures of the two machines F and D, which are in series with each other relative to the machine H, and that the remainder of the current required for the armatures of machines F and D is supplied from the source A', acting in multiple with H; also, it will be noted that the machine F as a motor drives H as a generator.

If now it be desired to increase the electromotive force upon the armature of D, and consequently its speed, the field of F is still further weakened, which causes a gradual decrease in the electromotive force produced by F and a corresponding gradual increase in the electromotive force upon the armature terminals of D, which causes a gradual increase in the speed of D. The machines F and D act continually under these conditions as motors and the machines H and A' as generators. When the field of F is finally reduced to zero, it produces no electromotive force and the full-line electromotive force will be upon the terminals of the armature of D. If now the connections leading to the field of F are reversed and a slight current sent around the field of F by adjustment of the rheostat G, the machine F will begin to act as a generator, its electromotive force being added to that of the line instead of being counter to that of the line, and the machine H will act as a motor and drive the armature of F at a practically constant speed. The machine H now receives current from the source A', which flows through its armature in a direction reverse to that in which the current flowed through its armature while H acted as a generator, but the polarity of the field of H, it will be noted, is independent of the direction of the current through its armature. It is also true of the machine F that the polarity of its field is independent of the direction of the current through its armature.

By gradually increasing the strength of the field of F its full electromotive force may be added to that of A', in series, so that the electromotive force upon the armature terminals of D will be double the electromotive force of the line. It will be noted that under these conditions the electromotive force upon the machine D will be twice that upon the machine F, and that hence the watts upon the armature of F will be only one-half the watts upon the armature of D; that is, by means of the regulator F it will be possible to regulate an amount of energy equal to twice the kilowatt capacity of the regulator.

In stopping or slowing down no mechanical brakes are required in connection with my apparatus, since the energy due to the retardation of the load is converted into electrical energy and fed back to the line. For instance, if while the car is in operation at full speed it be desired to retard the moving load the lever of the rheostat G is moved so as to weaken the field of machine F and reduce the electromotive force generated thereby. The speed of the armature of D being maintained temporarily by the momentum of the moving load, the electromotive force at the armature terminals of the machine D becomes higher than the sum of the electromotive forces of A' and F. Consequently D becomes a generator, supplying current through the armature of machine F, which now acts as a motor and drives H as a generator, thus supplying current through the trolley B into the conductor A, which current assists the source A' in supplying the current required by other translating devices. By continuing the movement of the lever of the rheostat beyond the position of zero field for machine F to the other limit of its movements, so that the full electromotive force of machine F acts in the same direction as that of D, (in which case F is a generator and H is a motor,) the armature of machine D is retarded from its full speed to a state of rest, and it will be noted that during such period the translating device, that is, the armature of D, acts as a dynamo-electric generator, in multiple with the source, to supply energy to other translating devices through a transformer of electric energy.

In starting up the motor D from a state of rest a small current taken from the supply-circuit at full voltage flows through the armatures of F and D back to the source, and a large current generated by H flows through the local closed loops 7 1 2 8, passing through the armatures of F and D in the same direction as the small current from the source, that is, watts represented by the full volts and small current taken from the supply-line are transformed and are utilized in the translating device as watts of practically the same amounts, but in the form of lower volts and larger current. When D is running at one-half of its full speed, practically no watts are transformed, and when D is running at full speed only one-half of the watts required by it are transformed. If it be desired to run the motor D in the opposite direction, it is preferable to do this by reversing its own armature connections, which may be accomplished by the reversing-switch I, which is thrown when the voltage upon the terminals of D is zero or comparatively low.

Since, as pointed out above, the electromotive force of machine F is practically independent of the current passing through it, it follows that there can be maintained upon the armature-terminals of machine D any desired electromotive force practically independent of the current passing through it. Since D has a practically constant field, its armature can be operated at any desired speed, which speed will be automatically constant independent of its torque, the electromotive force generated by F being different for each different speed of the armature of machine D, but being maintained constant for each particular speed. The field of D being practically constant, the speed of its armature will be practically proportional to its volts and the torque of the armature will be practically proportional to the amperes passing through it.

Wherever the word "constant" is used throughout the specification and claims it is to be understood that such term means "practically constant." It is also to be noted that any suitable form of apparatus which accomplishes the result I have described above may be substituted for the two mechanically-connected dynamo-electric machines H and F without departing from the spirit of my invention.

It will be observed that other forms of translating devices may be substituted for the armature of the dynamo-electric machine D without departing from the spirit of my invention.

What I claim is—

1. The method of varying the speed of an electric motor consisting in supplying the same with current from a source of constant electromotive force in series with the current from a dynamo-electric machine whose field is variable and reversible, and in varying and reversing the field of said dynamo-electric machine to vary the electromotive force at the motor from zero to a maximum, substantially as set forth.

2. The combination of an electric motor, a source of supply for said motor, and a regulator consisting of an electromotive-force-producing device located between the source and the motor and whose electromotive force is variable independently of the electromotive force of the circuit across which the motor-armature is connected, substantially as set forth.

3. The combination of an electric motor, a source of supply for said motor, a dynamo-electric machine located between the source and the motor and whose electromotive force is variable independently of the electromotive force of the circuit across which the motor-armature is connected, and means for varying and reversing the electromotive force of said dynamo to regulate said motor, substantially as set forth.

4. The combination of an electric motor, a source of supply for said motor, and a regulating device in series with the armature of said motor and acting sometimes to receive energy from the line and sometimes to return energy to the line, substantially as set forth.

5. The combination with a source of supply and a circuit extending therefrom, of an electric motor, a regulating dynamo-electric machine connected in series with said motor across said circuit, said dynamo being adapted to produce an electromotive force variable independently of the electromotive force of said circuit, and a dynamo-electric machine mechanically connected with the regulating-dynamo and electrically connected with the supply-circuit, substantially as set forth.

6. The combination of a number of dynamo-electric machines whose fields are in multiple with each other and whose armatures are in series with each other, and means for varying and reversing the field of one of said machines, substantially as set forth.

7. The combination of a source of practically constant potential, a circuit extending therefrom, a shunt dynamo-electric machine in a cross-circuit from the source, and another cross-circuit containing in series the armature of an electric motor and the armature of a dynamo-electric machine having a variable field and mechanically connected with the first-mentioned dynamo, substantially as set forth.

8. The combination with a source of electric energy, of three dynamo-electric machines, all of whose armatures are connected therewith, which are adapted to run as two motors and one generator, or two generators and one motor, at different times, substantially as set forth.

9. The combination with a source of electric energy, of a motor driven thereby, a generator mechanically connected with and driven by said motor, and a working motor whose armature is supplied with energy from both the source and said generator, the electromotive force of the generator being variable independently of the electromotive force of the circuit across which the armature of the working motor is connected, substantially as set forth.

10. The combination of a source of electric energy, a motor driven thereby, a translating device which has no electromotive force upon its terminals, except when current is passing through it, connected in series with the motor, and means whereby the mechanical energy of said motor is converted into electrical energy and used in multiple with the source to supply said translating device, substantially as set forth.

11. The combination of a source of electric energy, a constantly-revolving motor connected therewith, a generator driven by said motor, and a variable-speed motor supplied with energy from both the source and said generator acting in multiple with each other, substantially as set forth.

12. The combination with a translating device which has no electromotive force upon its terminals except when current is passing through it, of two generators simultaneously supplying current thereto, said generators being connected in multiple with each other and one being operated by power derived from the other, substantially as set forth.

13. The combination with a source of electric energy, of an electrically-propelled vehicle having three dynamo-electric machines, one of said machines being connected to the driving mechanism of the vehicle, the other two having their armatures mechanically connected together and rotating independently of the motion of the vehicle and having field-windings connected in multiple, and the armature of one of said machines being connected across the source in series with the armature of the machine connected to the driving mechanism of the vehicle, substantially as set forth.

14. The combination with an electric motor, of an electromotive-force regulator having a motor-winding and a generator-winding the generator-winding being in shunt with the line and the motor-winding being in shunt with the line and in series with a motor to be regulated, substantially as set forth.

15. The method of operating a translating device which has no electromotive force upon its terminals except when current is passing through it, which consists in placing in circuit with the translating device a device or devices which absorb the watts represented by the product of the amperes through the translating device times the difference between the volts desired upon the terminals of the translating device and the volts of the supply-circuit, and simultaneously utilizing in the production of useful electrical power the watts so absorbed, substantially as set forth.

16. The method of operating an electric motor at any desired speed, which consists in placing in circuit with the motor a device or devices which absorb the watts represented by the product of the amperes through the motor times the difference between the volts desired upon the motor and the volts of the supply-circuit, and simultaneously utilizing in the production of useful mechanical power the watts so absorbed, substantially as set forth.

17. The method of operating an electric motor at any desired speed, which consists in placing in circuit with the motor, a device or devices which absorb the watts represented by the product of the amperes through the motor times the difference between the volts desired upon the motor and the volts of the supply-circuit, and converting the watts so absorbed into mechanical energy which is converted into useful electrical energy, substantially as set forth.

18. The method of operating an electric motor at any desired speed, which consists in placing in circuit with the motor, a device or devices which absorb the watts represented by the product of the amperes through the motor times the difference between the volts desired upon the motor and the volts of the supply-circuit, and converting the watts so absorbed into electric energy and simultaneously utilizing in the motor the electric energy so converted, substantially as set forth.

19. The method of operating an electric motor at any desired speed, which consists in placing in circuit with the motor, a device or devices which absorb the watts represented by the product of the amperes through the motor times the difference between the volts desired upon the motor and the volts of the supply-circuit, and simultaneously converting the watts so absorbed into electric energy having the voltage desired at the motor and supplying said converted energy to the motor, substantially as set forth.

20. The method of operating an electric motor which consists in placing in electrical connection with it a transformer of electric energy having one or more moving parts which receives electric energy in series with the motor and delivers electric energy in multiple with the motor, or vice versa, and varying the voltage at which the electric energy is received or delivered to control the speed of the motor, substantially as set forth.

21. The method of operating an electric motor at any desired speed and torque which consists in placing in electrical connection therewith a transformer of electric energy having one or more moving parts and having two sections, one section being connected in series with the motor and the other section in shunt to the motor and operating the transformer so that its series section receives energy and the shunt-section delivers energy or vice versa, and varying the voltage at which the electric energy is received or delivered to control the speed to the motor, substantially as set forth.

22. The method of operating an electric motor or motors, which consists in placing in electrical connection with a source of supply for the motor and also with the motor or motors, means for transforming electric energy into mechanical energy or vice versa, and simultaneously utilizing in the operation of the motor or motors practically without waste the energy so transformed, substantially as set forth.

23. The method of generating and regulating a supply of electric energy, which consists in generating current, passing same into a multiple-arc-distribution system and through a source of variable electromotive force, and causing the electromotive force of the variable source to both oppose and assist the electromotive force of the source of supply, whereby the variable source of electric energy is enabled to regulate an amount of electric energy of twice the capacity of the regulator, substantially as set forth.

24. The method of regulating the electromotive force at the terminals of a translating device, consisting in so placing in the circuit, mechanically independent of the source, a dynamo-electric machine whose electromotive force is independent of the electromotive force of the conductors across which the translating device is connected, and whose kilowatt capacity is less than that required for operating the translating device, that by varying and reversing the electromotive force of said dynamo it will both assist and oppose the electromotive force of the source to vary the electromotive force at the terminals of the translating device, substantially as set forth.

25. The method of obtaining from a source of electromotive force a different and controllable electromotive force at the terminals of a translating device with a minimum waste of energy, consisting in placing in the path of the current leading to the translating device the armature of a dynamo-electric machine which is mechanically connected with the armature of a dynamo-electric machine having a shunt field-winding and acting sometimes as a motor and sometimes as a generator, and operating the first-named machine as a motor to reduce the electromotive force at the terminals of the translating device, and as a generator to raise the electromotive force at the terminals of the translating device, substantially as set forth.

26. The method of converting into electrical energy the power represented by retarding a moving load, which consists in causing the moving load to drive a generator, supplying from said generator current to a motor electrically connected with the said generator, driving by said motor a second generator, the armatures of said generators and motor being electrically connected together, and supplying by said second generator current to other translating devices, substantially as set forth.

27. The method of converting into electrical energy the power represented by retarding a moving load, which consists in causing the moving load to drive a generator, supplying from said generator current to a motor having a reversible field and connected in series with the said generator across a source of electric energy, driving by said motor a second generator, and supplying by said second generator current to other translating devices, substantially as set forth.

28. The combination with a source of electric energy, a multiple-arc distribution leading therefrom and across which a translating device is connected, of a transformer of electric energy having two electromotive-force-producing windings, one of which is in series between the source and the translating device and the other of which is in multiple with the translating device, relative to the source, each of said windings being in a magnetic field whose polarity is independent of the direction of current through its respective electromotive-force-producing winding, substantially as set forth.

29. The combination with a source of electric energy, of a translating device which has no electromotive force upon its terminals except when current is passing through it, and an electric-energy transformer having two electromotive-force-producing windings electrically connected together, the first receiving electric energy, and delivering mechanical energy to the second, and the second transforming the mechanical energy so received into electric energy and delivering it back to the first, substantially as set forth.

30. The combination of two electromotive-force-producing windings, both having practically equal watts at all times, one receiving and the other delivering electric energy or vice versa, both being electrically and mechanically connected together and the voltage upon the terminals of the two windings being normally different, and a translating device connected therewith, substantially as set forth.

31. The combination of a generator supplying a part of the current required by two motors whose armatures are in series with each other relative to said generator, one of which motors drives the said generator, substantially as set forth.

32. The combination of a source of electric energy, a circuit extending therefrom, two dynamo-electric machines H and F electrically connected therewith and mechanically connected together, a dynamo-electric machine D whose armature is connected in multiple arc with the machine H and in series with the armature of the machine F, said machine F being adapted to produce an electromotive force variable and reversible independently of the electromotive force upon the armature-terminals of the machine D, substantially as set forth.

33. The combination of a source of electric energy, a circuit extending therefrom, two dynamo-electric machines connected electrically therewith and mechanically connected together, one of said machines having upon its terminals a practically constant electromotive force, and the other having a field magnetism independent of its own electromotive force and producing a variable electromotive force, said latter machine being connected in series with a translating device, the electromotive force upon whose terminals is regulated by varying the electromotive force of said latter machine, substantially as set forth.

34. The combination of a source of electric energy, a circuit extending therefrom, two dynamo-electric machines connected electrically therewith and mechanically connected together, one of said machines having upon its terminals a practically constant electromotive force, and the other having a field magnetism independent of its own electromotive force and producing a variable and reversible electromotive force, said latter machine being connected in series with a translating device, the electromotive force upon whose terminals is regulated by varying and reversing the electromotive force of said latter machine, substantially as set forth.

35. The combination of two dynamo-electric machines A' and H, the electromotive force at the terminals of which is practically constant, and two dynamo-electric machines F and D in series with each other, the electromotive force of each being variable, and the speed of one of the latter machines being practically constant and the speed of the other variable, substantially as set forth.

36. The combination with a source of practically constant electromotive force, a dynamo-electric machine having a constant field, a dynamo-electric machine having a variable and reversible field, the armatures of said machines being connected in series, and means mechanically connected with the said second dynamo-electric machine for receiving energy from or delivering energy to said second dynamo-electric machine, substantially as set forth.

37. The combination with a source of practically constant electromotive force, of a dynamo-electric machine having a practically constant field and variable speed, a dynamo-electric machine having a variable and reversible field, and means for maintaining said machine at a practically constant speed, the armatures of said dynamo-electric machines being connected in series across the source, substantially as set forth.

38. The combination with a source of electric energy, of a dynamo-electric machine having a practically constant speed and a field magnetism independent of its own electromotive force and whose armature is connected in series across the source with that of a motor of variable speed, the variations of speed in the motor being accomplished by variations in the field of the dynamo-electric machine, substantially as set forth.

39. The combination with a source of electric energy, of a dynamo-electric machine running at a practically constant speed and having a variable and reversible field, and a dynamo-electric machine running at a variable speed and having a practically constant field, the armatures of said machines being connected in series with each other, across the source whereby the speed of the latter machine is controlled by variations in the field of the first-named machine, substantially as set forth.

40. The combination of a dynamo-electric machine running at a practically constant speed and having a variable and reversible field, and a dynamo-electric machine running at a variable speed and having a practically constant field, the armatures of said machines being connected in series with each other across a source of practically constant electromotive force, whereby the speed of the latter machine is controlled by variations in the field of the first machine, substantially as set forth.

41. The method of operating an electric motor at any desired speed from rest to full speed, which consists in causing a current to flow through a device electrically connected with the motor while the motor is in operation, and absorbing by means of said device the watts represented by the product of the amperes through the motor times the difference between the volts desired upon the motor and the volts of the supply-circuit, and simultaneously utilizing in the production of useful power the watts so absorbed, substantially as set forth.

42. The method of operating an electric motor at any desired speed from rest to full speed, which consists in operating a transformer of electric energy having one or more moving parts, which transformer receives electric energy in series with the motor and delivers electric energy in multiple with the motor, or vice versa, substantially as set forth.

43. The method of operating an electric motor at any desired speed from rest to full speed which consists in operating a transformer of energy which delivers energy to the motor, said transformer at certain speed of the motor receiving energy in series with the motor, and at other speeds of the motor receiving energy in multiple with the motor, and in either case delivering energy to the motor, substantially as set forth.

44. The combination of two electromotive-force-producing windings, both having practically equal watts at all times, one receiving and the other delivering energy, or vice versa, both being, under all operative conditions, electrically and mechanically connected together, means for maintaining one winding at practically constant voltage and means for varying and reversing the voltage on the other winding, substantially as set forth.

45. The combination of two electromotive-force-producing windings, both having practically equal watts at all times, one receiving and the other delivering energy, or vice versa, both being, under all operative conditions, electrically and mechanically connected together, the voltage of one of the windings being varied and reversed in practice, and a translating device, which has no electromotive force upon its terminals, except when current is passing through it, connected in series with the latter, substantially as set forth.

46. The method of securing through the armature of a dynamo-electric machine by means of a small current from the source of supply, a much larger current, which consists in placing in electrical connection with the armature of the dynamo-electric machine a generator-winding and a motor-winding, which generator-winding supplies current to the said motor-winding, substantially as set forth.

47. The combination with a source of electric energy, of an armature whose speed is to be regulated connected in series with a regulating-armature, the two armatures being in series under all operative conditions and the regulating-armature being in a reversible field and which field is independent of the electromotive force of the regulating-armature, substantially as set forth.

48. The combination of a generator of electric energy whose armature is connected with a constant electromotive-force-supply circuit, a transformer of electric energy connected with said generator, and means whereby the said generator in being brought to rest continually delivers electric energy into said supply-circuit, substantially as set forth.

49. The combination with a source of electric energy, of a transformer of electric energy, a translating device acting as a dynamo-electric generator in multiple with the source to supply energy to other translating devices through said transformer, the speed of said transformer being practically constant, and the speed of the generator varying from full speed to rest, substantially as set forth.

50. The combination of three dynamo-electric machines whose armatures are connected in series, two being motors, and means for rendering the voltage upon the terminals of each of the three armatures practically independent of fluctuations of the current through their armatures, substantially as set forth.

51. The combination with a source of electric energy, of a translating device, the armature of a dynamo-electric machine connected between the source and said translating device and running in a variable field whose strength is independent of the electromotive force of the armature, and a dynamo-electric machine mechanically connected with said armature and electrically connected with the supply-circuit, substantially as set forth.

52. The method of reducing the electromotive force upon the terminals of a translating device connected to a constant electromotive-force circuit which consists in passing the current supplied to the translating device, through the armature of an electric motor whose field is connected across the circuit, and driving by said armature a shunt-generator connected across the circuit, substantially as set forth.

53. A local closed loop connected to a source of electric energy, there being in series in the closed loop and in combination therewith three armatures, one being a generator-armature and one a motor-armature, substantially as set forth.

54. A closed loop connected to a source of electric energy, there being in series in the closed loop and in combination therewith two armatures, one being a generator-armature and the other a motor-armature, and means for reversing the motor-armature, substantially as set forth.

55. The method of operating an electric motor at any desired speed from rest to full speed which consists in inductively developing in series with the armature of the motor between the source of supply and the motor a unidirectional electromotive force variable from zero to the electromotive force of the source of supply which is independent of the speed of the motor and independent of the current through the motor, substantially as set forth.

56. The method of operating an electric motor at any desired speed from rest to full speed which consists in developing in series with the armature of the motor, by means of a revolving winding, an electromotive force between the source of supply and the motor which is variable from zero to the electromotive force of the source, independent of the speed of revolution of the revolving winding, substantially as set forth.

57. The combination with a source of constant electromotive force, a motor driven thereby, a generator driven by said motor, said generator being in series with the source, and a motor whose armature is in series with both the source and said generator, and whose field is independent of its armature electromotive force, substantially as set forth.

58. The combination of two generators located at distant points and supplying current in multiple with each other to the same motor-armature, one of the generators being so connected mechanically as to be driven by said motor-armature, substantially as set forth.

59. The method of operating at several different automatic speeds an electric motor which is connected to a constant-electromotive-force source, which consists in developing in series with the motor between it and the source a regulable electromotive force which is constant for each different automatic speed, substantially as set forth.

60. The combination with a translating device, the electromotive force upon whose terminals is to be regulated, of a regulating dynamo-electric machine whose armature is in series with the translating device, the field strength of the said regulating dynamo being practically independent of the electromotive force upon and current through the translating device, substantially as set forth.

61. The method of operating at variable speed an electric motor connected to a constant-electromotive-force-supply circuit which consists in taking from the supply-circuit an amount of energy, practically equal to that required to operate the motor without waste of energy, and transforming said energy and supplying it to the motor in such a manner that the volts will be practically proportional to the speed desired and the amperes practically proportional to the torque required, substantially as set forth.

62. The combination with a source of electric energy, a multiple-arc distribution leading therefrom and across which a translating device is connected, of a transformer of electric energy having two electromotive-force-producing windings, one of which is in series between the source and the translating device and the other of which is in multiple with the translating device, relative to the source, one winding being adapted to receive electric energy while the other delivers electric energy, and vice versa, substantially as set forth.

This specification signed and witnessed this 23d day of June, 1892.

HARRY WARD LEONARD.

Witnesses:
EUGENE CONRAN,
W. PELZER.